(12) United States Patent
Gibson et al.

(10) Patent No.: US 6,336,065 B1
(45) Date of Patent: Jan. 1, 2002

(54) METHOD AND SYSTEM FOR ANALYZING FAULT AND SNAPSHOT OPERATIONAL PARAMETER DATA FOR DIAGNOSTICS OF MACHINE MALFUNCTIONS

(75) Inventors: David Richard Gibson, North East, PA (US); Nicholas Edward Roddy; Anil Varma, both of Clifton Park, NY (US)

(73) Assignee: General Electric Company

( * ) Notice: Subject to any disclaimer, the term of this patent is extended or adjusted under 35 U.S.C. 154(b) by 0 days.

(21) Appl. No.: 09/438,271

(22) Filed: Nov. 12, 1999

Related U.S. Application Data (60) Provisional application No. 60/162,045, filed on Oct. 28, 1999.

(51) Int. Cl.$^7$ .......................... G06F 11/25; G06F 11/22; B61C 17/04; B61C 17/02

(52) U.S. Cl. ............................. 701/29; 701/35; 701/36; 371/30; 340/438; 340/500

(58) Field of Search ............................. 701/29, 30, 34, 701/36, 35, 1, 107; 340/438, 441, 459, 500; 395/500; 371/30, 47.1

(56) References Cited

U.S. PATENT DOCUMENTS

| | | | |
|---|---|---|---|
| 4,270,174 A | 5/1981 | Karlin et al. | |
| 4,463,418 A | 7/1984 | O'Quin, II et al. | |
| 4,517,468 A | 5/1985 | Kemper et al. | |
| 4,695,946 A | 9/1987 | Andreasen et al. | |
| 4,823,914 A | 4/1989 | McKinney et al. | |
| 4,970,725 A | 11/1990 | McEnroe et al. | |
| 4,977,390 A | 12/1990 | Saylor et al. | |
| 5,113,489 A | 5/1992 | Cihiwsky et al. | |
| 5,123,017 A | 6/1992 | Simpkins et al. | |
| 5,157,610 A | 10/1992 | Asano et al. | |
| 5,255,208 A | 10/1993 | Thakore et al. | |
| 5,274,572 A | 12/1993 | O'Neill et al. | |
| 5,282,127 A | 1/1994 | Mii | |
| 5,282,212 A | 1/1994 | Shah | |
| 5,321,837 A | 6/1994 | Daniel et al. | |
| 5,329,465 A | 7/1994 | Arcella et al. | |
| 5,400,018 A | 3/1995 | Scholl et al. | |
| 5,406,502 A | 4/1995 | Haramaty et al. | |
| 5,414,645 A | 5/1995 | Hirano | |
| 5,445,347 A | 8/1995 | Ng | |
| 5,508,941 A | 4/1996 | Leplingard et al. | |
| 5,528,516 A | 6/1996 | Yemini et al. | |
| 5,566,091 A | 10/1996 | Schricker et al. | |
| 5,572,424 A | * 11/1996 | Kellogg et al. ................ | 701/29 |
| 5,594,663 A | 1/1997 | Messaros et al. | |
| 5,631,831 A | 5/1997 | Bird et al. | |
| 5,633,628 A | 5/1997 | Denny et al. | |
| 5,638,296 A | 6/1997 | Johnson et al. | |

(List continued on next page.)

FOREIGN PATENT DOCUMENTS

WO     00/60464    * 10/2000    ........... G06F/11/25

OTHER PUBLICATIONS

Pregrant publication # US2001/0012814A1–May et al. Aug. 9, 2001.*
Data–Tronic Gas Turbine Information And Control System; General Electric Gas Turbine Reference Library; 8 pgs.

Primary Examiner—William A. Cuchlinski, Jr.
Assistant Examiner—Olda Hernandez
(74) Attorney, Agent, or Firm—Carl A. Rowold, Esq.; Enrique J. Mora, Esq.; Beusse, Brownlee, Bowdoin & Wolter PA (57) ABSTRACT

A method for analyzing fault log data and snapshot operational parameter data from a machine undergoing diagnostics is provided. A receiving step allows for receiving fault log data comprising a plurality of faults from the machine. Respective executing steps allow for executing a set of noise-reduction filters upon the received fault log data to generate noise-reduced fault log data, and for executing a set of candidate snapshot anomalies upon the noise-reduced data to generate data predictive of malfunctions of the machine.

44 Claims, 11 Drawing Sheets

U.S. PATENT DOCUMENTS

| | | |
|---|---|---|
| 5,661,668 A | 8/1997 | Yemini et al. |
| 5,666,534 A | 9/1997 | Gilbert et al. |
| 5,678,002 A | 10/1997 | Fawcett et al. |
| 5,742,915 A | 4/1998 | Stafford |
| 5,815,071 A | 9/1998 | Doyle |
| 5,845,272 A | 12/1998 | Morjaria et al. |
| 5,950,147 A | 9/1999 | Sarangapani et al. |
| 6,175,934 B1 | 1/2001 | Hershey et al. |
| 6,216,066 B1 * | 4/2001 | Goebel et al. ............... 701/29 |
| 6,266,339 B1 * | 7/2001 | Donahue et al. ............ 370/432 |

* cited by examiner

Fig. 1

| CUST | UNIT | DATE | CODE | DESC | DESC1 |
|---|---|---|---|---|---|
| RR | 3500 | Sun Jul 13 1997 | 1111 | Piping Fittings-Engine Intercooler | REPAIRED WATER LEAK AT TOP OF RT |
| RR | 3500 | Tue Jul 01 1997 | 2222 | Lube Oil-Engine | WATER IN LUBE OIL CHANGED OIL |
| RR | 3500 | Sat Jun 28 1997 | 3333 | BRP-Battery Charger Regulator Panel | NO BATTCHARGE-REPL BPR |
| RR | 3500 | Wed Jun 18 1997 | 4444 | EFI-High Pressure Pump | REPLACE 3 HP PUMPS NOT FOR FIRING |
| RR | 3500 | Mon Jun 09 1997 | 5555 | Turbocharger Assembly General-Eng | TURBO DRAGSSECONDARY DAMAGE-RPL |
| RR | 3500 | Sat May 24 1997 | 6666 | Cylinder Assembly General-Eng | REPL R6 PA FOR SECONDARY DAMAGE |
| RR | 3500 | Sat May 24 1997 | 7777 | Cylinder Assembly General-Eng | TRIPPING COP PISTON FAILURE CO |

Fig. 2A

| FAILMODE_DESC | SUB_ASSEMBLY_CODE | MAIN_ASSEMBLY_CODE |
|---|---|---|
| LEAKING FLUIDAIR | ENGINTCOOL | ENGINE |
| CONTAMINATED | LUBEOIL | ENGISUPT |
| UNKNOWNUNDETERMINED | POWERPANEL | POWERELN |
| UNKNOWNUNDETERMINED | ENGFUELINJ | ENGINE |
| UNKNOWNUNDETERMINED | ENGTURBO | ENGINE |
| UNKNOWNUNDETERMINED | POWERASSY | ENGINE |
| UNKNOWNUNDETERMINED | POWERASSY | ENGINE |

| 40 | | | | | | | | | | | | 48 |
|---|---|---|---|---|---|---|---|---|---|---|---|---|
| 0 | 1 | 2 | 0 | 101 | 97 | R | E | 0 | 0 | | | |
| 0 | 1 | 2 | 0 | 101 | 97 | R | E | 0 | 0 | | | Intake Manifold Air Too |
| 992 | 288 | 4706 | 202 | 177 | 182 | M | E | F | 0 | 6AB_M_S_ | COP Trip | Intake Manifold Air Too |
| 992 | 288 | 4706 | 202 | 177 | 182 | M | E | F | 0 | 6AB_M_S_ | COP Trip | |
| 885 | 338 | 2864 | 133 | 175 | 186 | M | E | 2 | 4 | 6AB_M_S_ | COP Trip | |
| 885 | 338 | 2864 | 133 | 175 | 186 | M | E | 2 | 4 | 6AB_M_S_ | COP Trip | |
| 458 | 6 | 0 | 0 | 174 | 186 | R | E | F | 4 | EAB | Fault Reset While in Lc | |
| 458 | 6 | 0 | 0 | 174 | 186 | R | E | F | 4 | EAB | Fault Reset While in Lc | |
| 992 | 474 | 3005 | 148 | 180 | 187 | M | E | 2 | 0 | R 6AB_M_S_ | COP Trip | |
| 992 | 474 | 3005 | 148 | 180 | 187 | M | E | 2 | 0 | R 6AB_M_S_ | COP Trip | |
| 1010 | 506 | 2405 | 128 | 179 | 189 | M | E | F | 4 | 6AB_M_S_ | COP Trip | |

Fig. 3B

| FAULT CODE | FAULT DESCRIPTION | TIME OF OCCURRENCE | RESET TIME | LOCOMOTIVE SPEED | ENGINE SPEED | WATER TEMPERATURE |
|---|---|---|---|---|---|---|
| 1000 | WHEELSIDE | | | | | |
| XX | VARIOUS | | | | | |
| XX | ANY | SAME AS PREVIOUS | | | | |
| XX | ANY | SAME AS PREVIOUS TWO FAULTS | | | | |
| XX | ANY | | | | | WATER TEMP IS $T_1$ DEG. HIGHER THAN OIL TEMP. & WATER TEMP. IS OVER $T_2$ DEG. |
| | ANY | | | | | |

Fig. 4A

| OIL TEMP | CALL | PROBLEM/ ACTION | REPAIR CODE | FILTER/ CSA | COMMENT |
|---|---|---|---|---|---|
| | | HANDBRAKE | 200 | CSA | HANDBRAKE ON |
| | S | IGNORE FAULT | | F | S INDICATES SELF-TEST |
| | | IGNORE DATAPACK | 201 | F | Fn LOGGED IN SAME PRE-DETERMINE INTERVAL PREVIOUS FAULTS Fn |
| | | IGNORE DATAPACK | 202 | F | Fn LOGGED IN SAME PRE-DETERMINE INTERVAL PREVIOUS FAULTS Fn |
| | | COOLING SYSTEM MALFUNCTION | 203 | CSA | |
| 62 { OIL TEMP IS T₁ DEG. HIGHER THAN WATER TEMP. & OIL TEMP. IS OVER T₂ DEG. | | LUBRICATION MALFUNCTION | 204 | CSA | |

METHOD AND SYSTEM FOR ANALYZING FAULT AND SNAPSHOT OPERATIONAL PARAMETER DATA FOR DIAGNOSTICS OF MACHINE MALFUNCTIONS

This application claims the benefit of U.S. Provisional Application No. 60/162,045 filed Oct. 28, 1999.

BACKGROUND OF THE INVENTION

The present invention relates generally to machine diagnostics, and more specifically, to a system and method for hybrid processing of snapshot operational parameter data and fault log data to facilitate analysis of a machine undergoing diagnostics.

A machine, such as a locomotive or other complex systems used in industrial processes, medical imaging, telecommunications, aerospace applications, power generation, etc., includes elaborate controls and sensors that generate faults when anomalous operating conditions of the machine are encountered. Typically, a field engineer will look at a fault log and determine whether a repair is necessary.

Approaches like neural networks, decision trees, etc., have been employed to learn over input data to provide prediction, classification, and function approximation capabilities in the context of diagnostics. Often, such approaches have required structured and relatively static and complete input data sets for learning, and have produced models that resist real-world interpretation.

Another approach, Case Based Reasoning (CBR), is based on the observation that experiential knowledge (memory of past experiences—or cases) is applicable to problem solving as learning rules or behaviors. CBR relies on relatively little pre-processing of raw knowledge, focusing instead on indexing, retrieval, reuse, and archival of cases. In the diagnostic context, a case refers to a problem/solution description pair that represents a diagnosis of a problem and an appropriate repair.

CBR assumes cases described by a fixed, known number of descriptive attributes. Conventional CBR systems assume a corpus of fully valid or "gold standard" cases that new incoming cases can be matched against.

U.S. Pat. No. 5,463,768 discloses an approach which uses error log data and assumes predefined cases with each case associating an input error log to a verified, unique diagnosis of a problem. In particular, a plurality of historical error logs are grouped into case sets of common malfunctions. From the group of case sets, common patterns, i.e., consecutive rows or strings of data, are labeled as a block. Blocks are used to characterize fault contribution for new error logs that are received in a diagnostic unit. Unfortunately, for a continuous fault code stream where any or all possible fault codes may occur from zero to any finite number of times and where the fault codes may occur in any order, predefining the structure of a case is nearly impossible.

U.S. patent application Ser. No. 09/285,611, assigned to the same assignee of the present invention and herein incorporated by reference, discloses a system and method for processing historical repair data and fault log data, which is not restricted to sequential occurrences of fault log entries and which provides weighted repair and distinct fault cluster combinations, to facilitate analysis of new fault log data from a malfunctioning machine. Further, U.S. patent application Ser. No. 09/285,612, assigned to the same assignee of the present invention and herein incorporated by reference, discloses a system and method for analyzing new fault log data from a malfunctioning machine in which the system and method are not restricted to sequential occurrences of fault log entries, and wherein the system and method predict one or more repair actions using predetermined weighted repair and distinct fault cluster combinations.

It is believed that the inventions disclosed in the foregoing patent applications provide substantial advantages and advancements in the art of diagnostics. It would be desirable, however, to provide a system and method that uses snapshot observations of operational parameters from the machine in combination with the fault log data in order to further enhance the predictive accuracy of the diagnostic algorithms used therein. It would be further desirable, through the use of noise reduction filters, to substantially eliminate undesirable noise, e.g., unreliable or useless information that may be present in the fault log data and/or the operational parameter data. This noise reduction would advantageously allow for increasing the probability of early detection of actual incipient failures in the machine, as well as decreasing the probability of falsely declaring non-existent failures.

BRIEF SUMMARY OF THE INVENTION

Generally speaking, the present invention fulfills the foregoing needs by providing a method for analyzing fault log data from a machine undergoing diagnostics. A receiving step allows for receiving fault log data comprising a plurality of faults from the machine. Respective executing steps allow for executing a set of noise-reduction filters upon the received fault log data to generate noise-reduced fault log data, and for executing a set of candidate snapshot anomalies upon the noise-reduced data to generate data predictive of malfunctions of the machine.

In another embodiment, the methods allows for receiving fault log data including a plurality of faults from the machine and for receiving operational parameter data including a plurality of operational parameters from the machine. A executing step allows for executing a set of candidate snapshot anomalies upon the fault log data and upon the operational parameter data. A combining step allows for combining any candidate snapshot anomalies respectively triggered by the fault log data with any candidate snapshot anomalies respectively triggered by the parameter data to generate data predictive of malfunctions of the machine.

The present invention further fulfills the foregoing needs by providing a system for analyzing fault log data and operational parameter data from a machine undergoing diagnostics. The system includes means for receiving fault log data including a plurality of faults from the machine. A memory unit is configured to store a set of noise-reduction filters and a set of candidate snapshot anomalies. A processor is respectively coupled to the means for receiving fault log data and to the memory unit. The processor includes means for executing the set of noise-reduction filters upon the received fault log data to generate noise-reduced fault log data, and further includes means for executing the set of candidate snapshot anomalies upon the noise-reduced data to generate data predictive of malfunctions of the machine.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
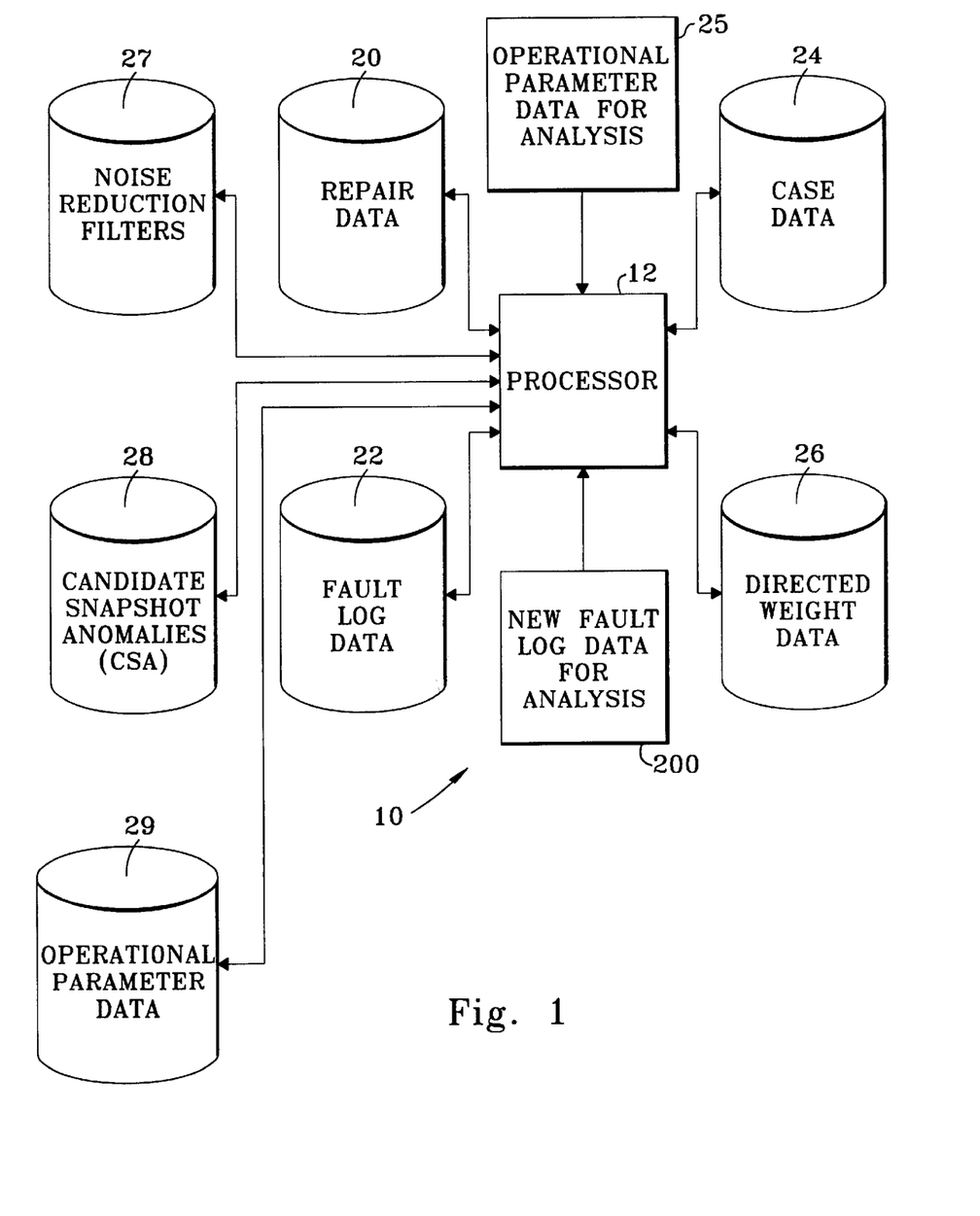
FIG. 1 is one embodiment of a block diagram of a system of the present invention that uses a processor for processing operational parameter data and fault log data from one or more machines and diagnosing a malfunctioning machine.

FIG. 1 diagrammatically illustrates one embodiment of a diagnostic system 10 of the present invention. System 10 provides a process for automatically harvesting or mining repair data comprising a plurality of related and unrelated repairs and fault log data comprising a plurality of faults, from one or more machines such as locomotives, and generating weighted repair and distinct fault cluster combinations which are diagnostically significant predictors to facilitate analysis of new fault log data from a malfunctioning locomotive. In one aspect of the invention, system 10 allows for hybridly analyzing the fault log data jointly with operational parameters from the machine.

Although the present invention is described with reference to a locomotive, system 10 can be used in conjunction with any machine in which operation of the machine is monitored, such as a chemical, an electronic, a mechanical, or a microprocessor machine.

Exemplary system 10 includes a processor 12 such as a computer (e.g., UNIX workstation) having a hard drive, input devices such as a keyboard, a mouse, magnetic storage media (e.g., tape cartridges or disks), optical storage media (e.g., CD-ROMs), and output devices such as a display and a printer. Processor 12 is operably connected to and processes data contained in a repair data storage unit 20 and a fault log data storage unit 22. Processor 12 is further respectively connected to and processes noise-reduction filters stored in a storage unit 27, and candidate snapshot anomalies stored in a storage unit 28.

Figure 2A:
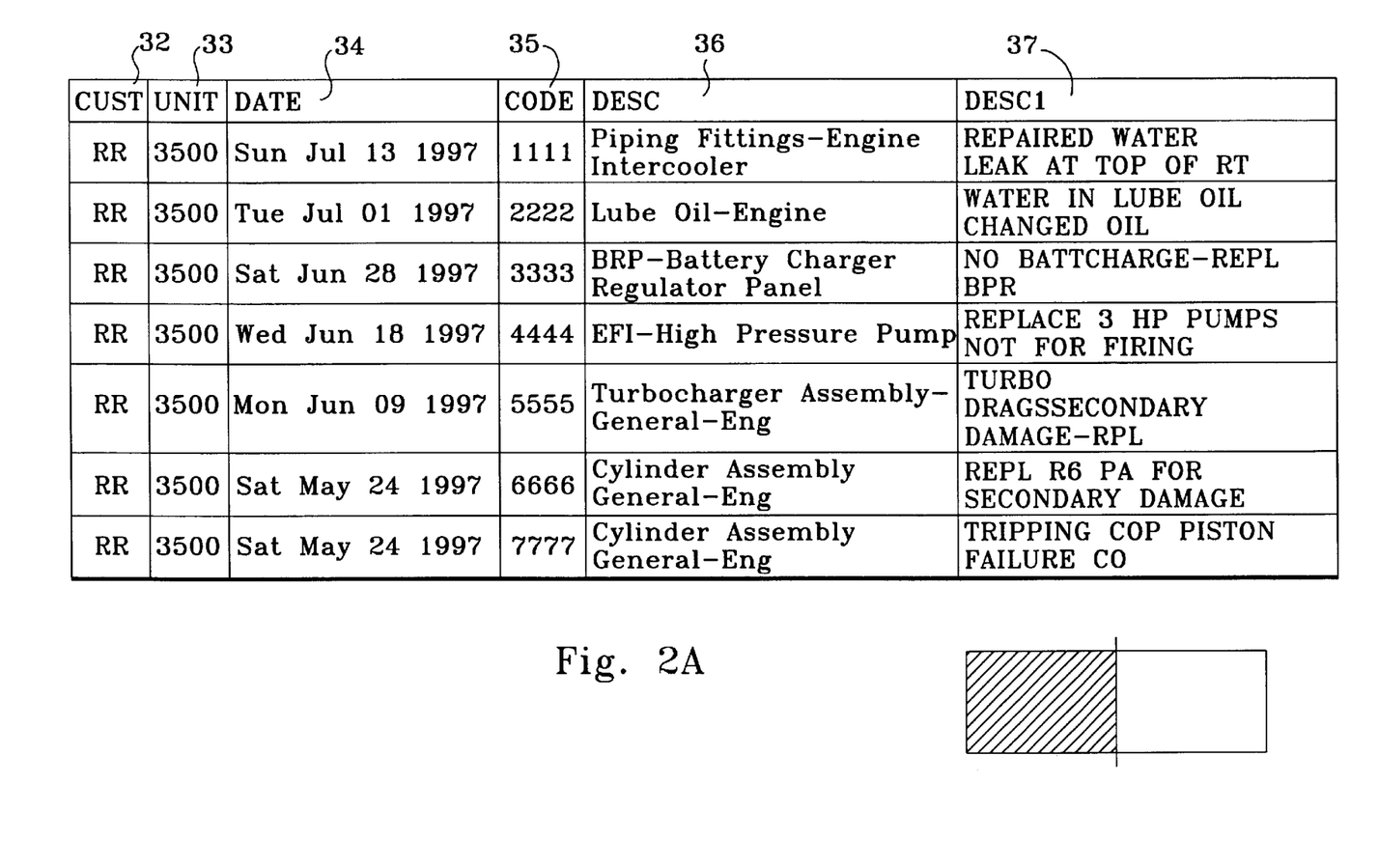
FIGS. 2A–2B are an illustration of exemplary repair log data.
Figure 2B:
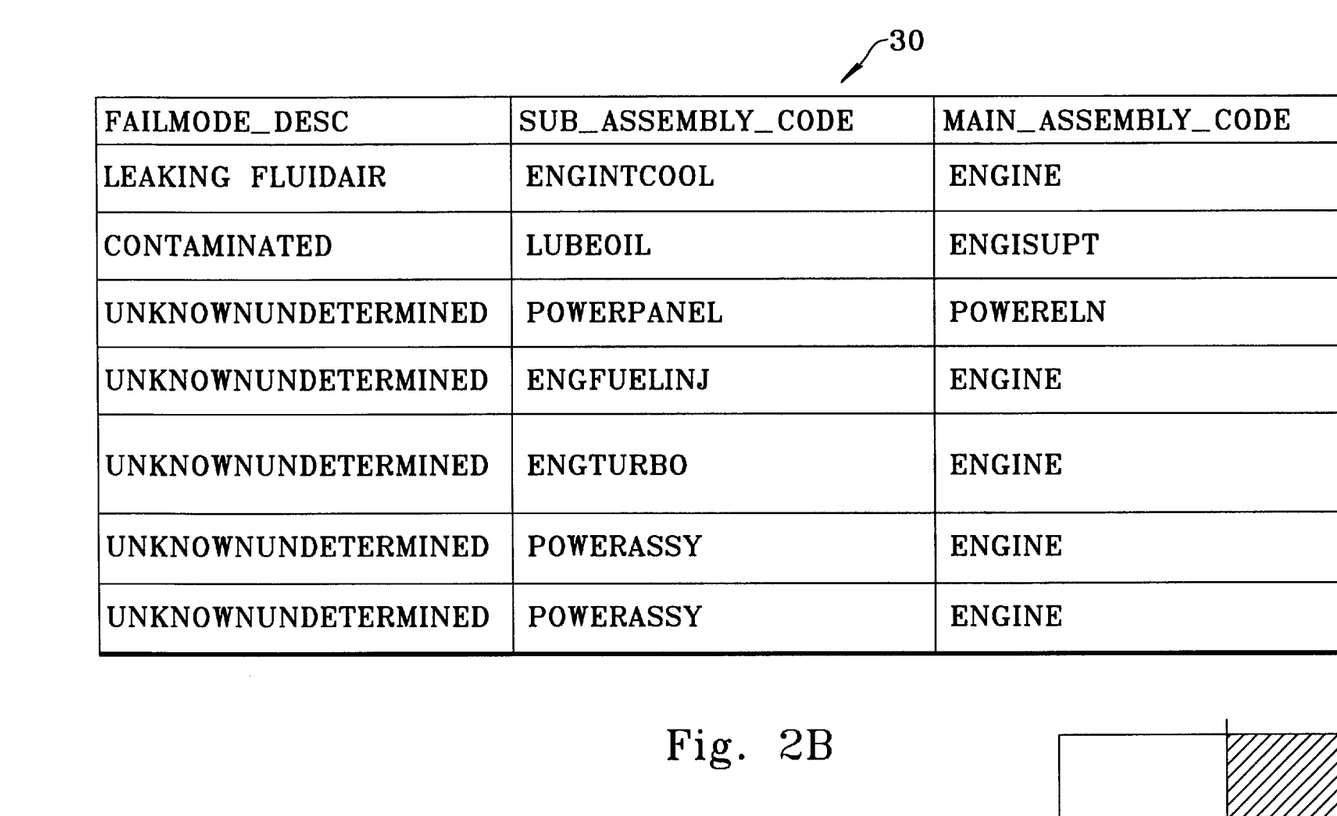

Repair data storage unit 20 includes repair data or records regarding a plurality of related and unrelated repairs for one or more locomotives. FIG. 2 shows an exemplary portion 30 of the repair data contained in repair data storage unit 20. The repair data may include a customer identification number 32, a locomotive identification or unit number 33, the date 34 of the repair, the repair code 35, a repair code description 36, a description of the actual repair 37 performed, etc.

Figure 3A:
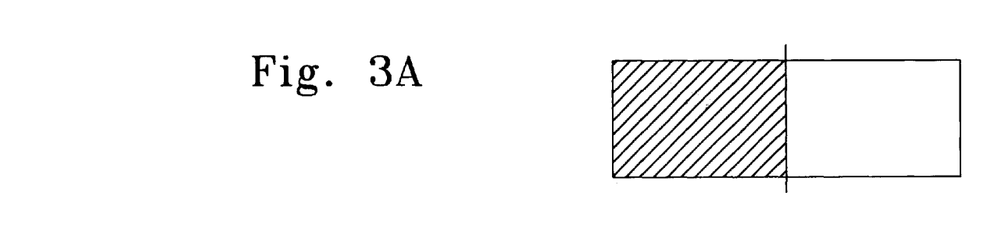
FIGS. 3A–3B are an illustration of exemplary fault log data.
Figure 3B:
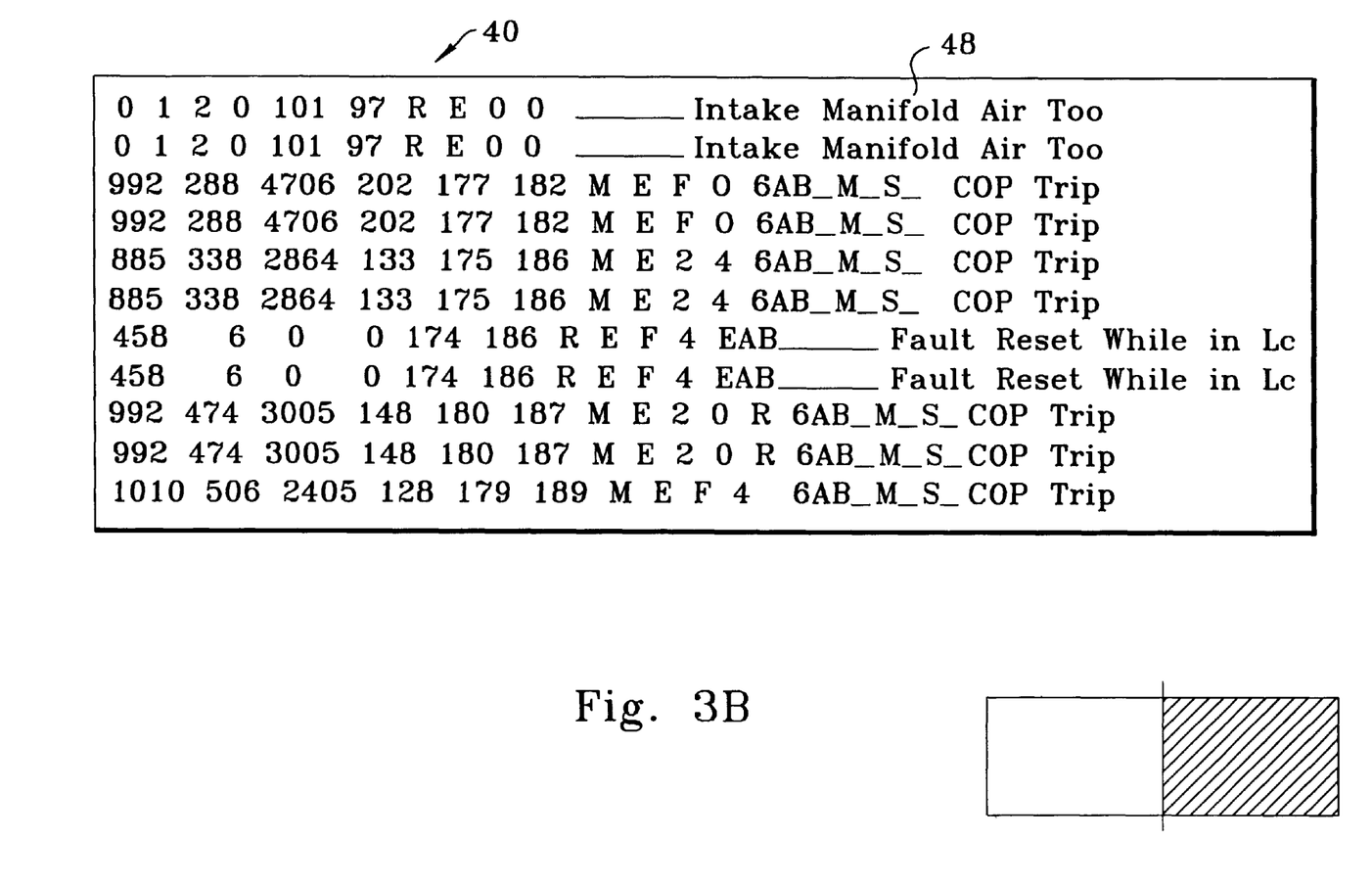

Fault log data storage unit 22 includes fault log data or records regarding a plurality of faults occurring prior to the repairs for the one or more locomotives. FIG. 3 shows an exemplary portion 40 of the fault log data contained in fault log data storage unit 22. The fault log data may include a customer identification number 42, a locomotive identification number or unit 44, the date 45 when the fault occurred, a fault code 46, a fault code description 48, etc.

As suggested above, additional data used in the analysis of the present invention include operational parameter data indicative of a plurality of operational parameters or operational conditions of the machine. The operational parameter data may be obtained from various sensor readings or observations, e.g., temperature sensor readings, pressure sensor readings, electrical sensor readings, engine power readings, etc. Examples of operational conditions of the machine may include whether the locomotive is operating in a motoring or in a dynamic braking mode of operation, whether any given subsystem in the locomotive is undergoing a self-test, whether the locomotive is stationary, whether the engine is operating under maximum load conditions, etc. It will be appreciated by those skilled in the art that the repair data storage unit, the fault log data storage unit, and the operational parameter data storage unit may respectively contain repair data, fault log data and operational parameter data for a plurality of different locomotives. It will be further appreciated that the operational parameter data may be made up of snapshot observations, i.e., substantially instantaneous readings or discrete samples of the respective values of the operational parameters from the locomotive. Preferably, the snapshot observations are temporally aligned relative to the time when respective faults are generated or logged in the locomotive. For example, the temporal alignment allows for determining the respective values of the operational parameters from the locomotive prior, during or after the logging of respective faults in the locomotive. The operational parameter data need not be limited to snapshot observations since substantially continuous observations over a predetermined period of time before or after a fault is logged can be similarly obtained. This feature may be particularly desirable if the system is configured for detection of trends that may be indicative of incipient failures in the locomotive.

Figure 4A:
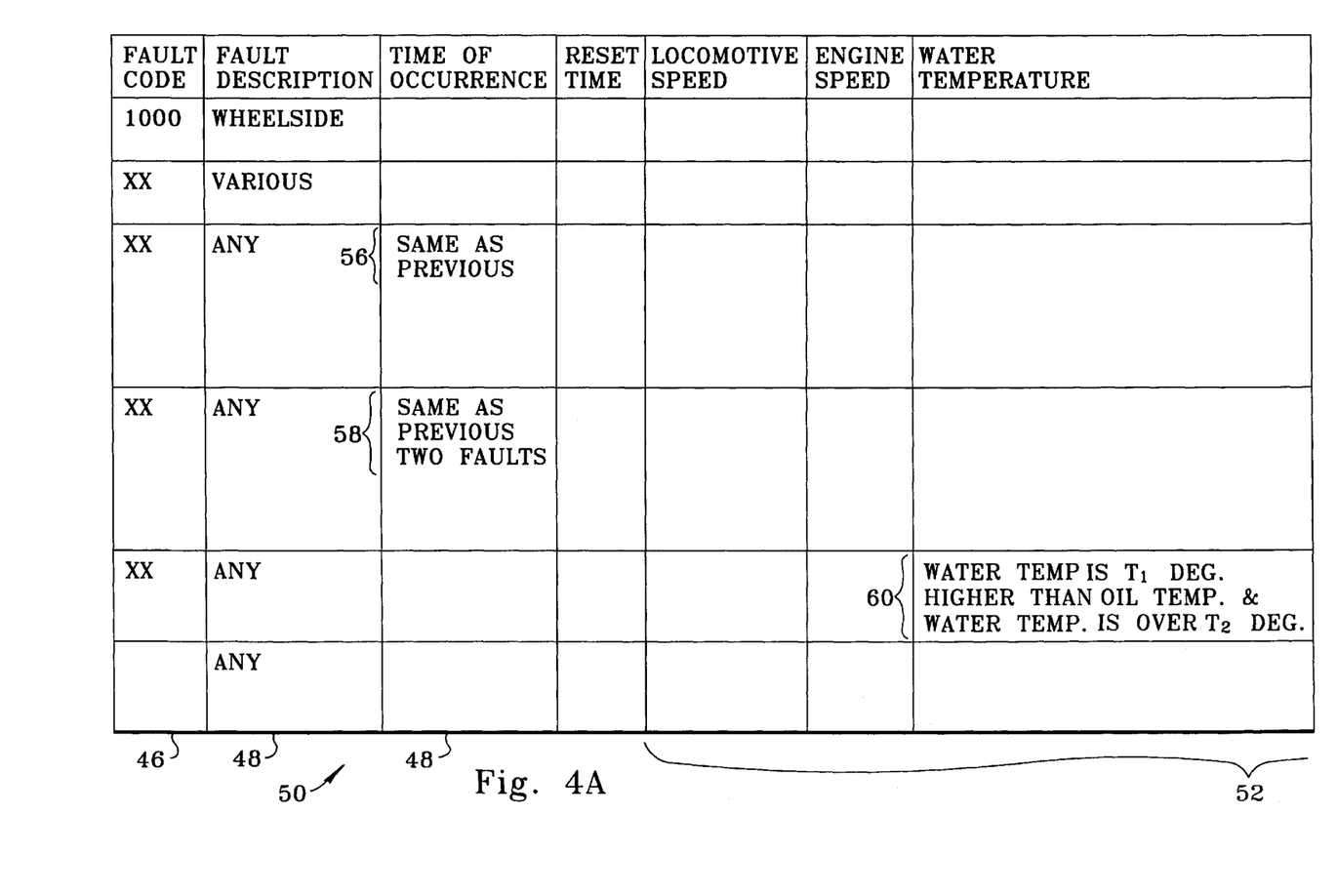
FIGS. 4A–4B are an illustration of exemplary hybrid data including in part fault log data and operational parameter data and further including exemplary noise reduction filters and candidate snapshot anomalies used to analyze the hybrid data.
Figure 4B:
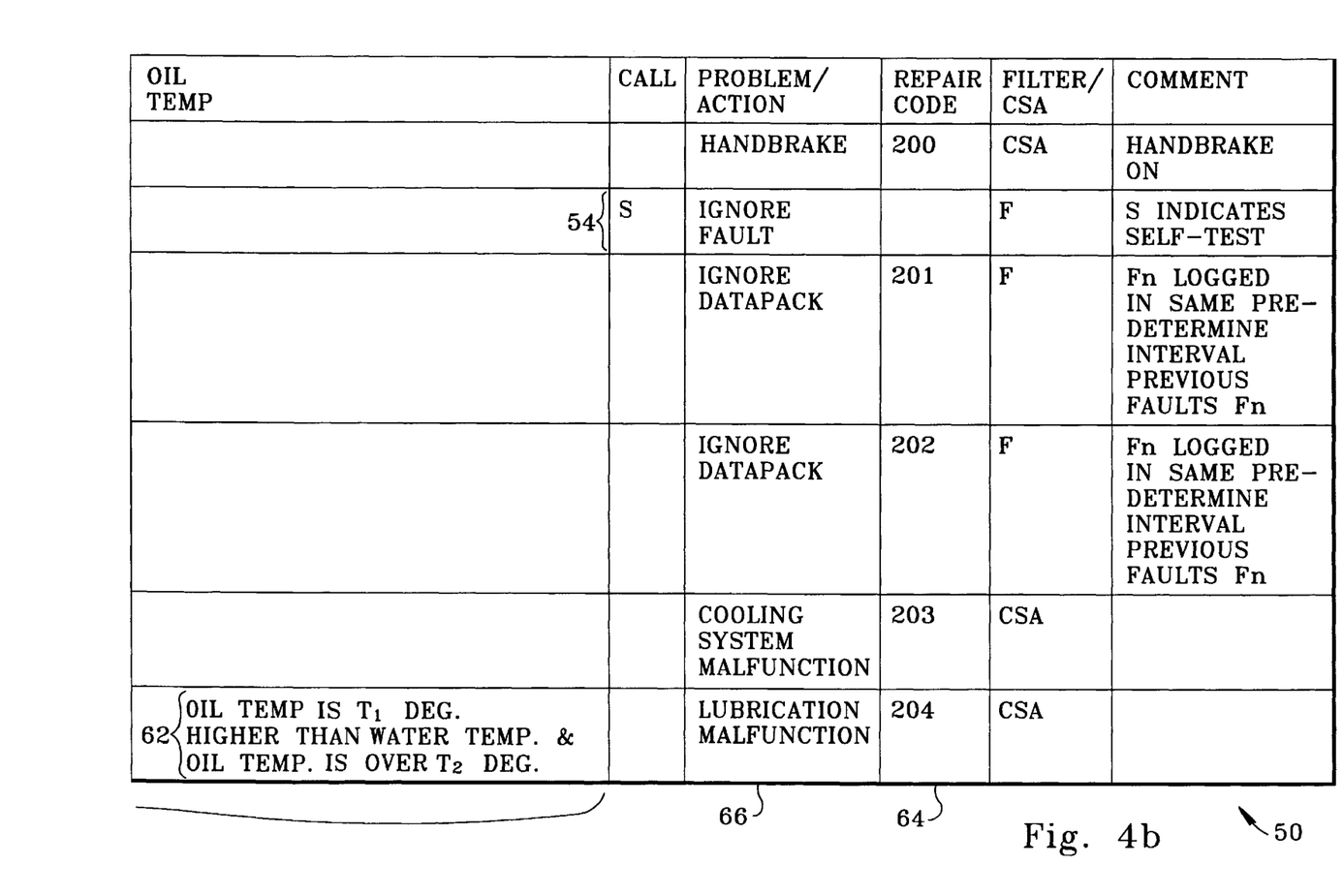

FIG. 4 shows an exemplary data file 50 that combines fault log data and operational parameter data 52, such as locomotive speed, engine water temperature, engine oil temperature, call status, etc. FIG. 4 further illustrates exemplary candidate snapshot anomalies and noise reduction filters that may be conveniently used to enhance the predictive accuracy of the algorithms of the present invention.

One example of a noise reduction filter is detection of a predetermined code, e.g., the letter S adjacent to bracket 54 in the column designated "call". In this case, this noise reduction filter allows for ignoring any faults that may have been logged while a self-test is being conducted. Another example of a noise reduction filter may be based on ignoring suspect or unreliable information, such as may occur upon detection of two or more consecutive faults within a predetermined period of time. For example, as illustrated in bracketed row 56, this noise reduction rule allows to ignore the snapshot observations of operational parameters 52 whenever any fault is logged within a predetermined period of time, e.g., $t_1$ ms, as any previously logged fault. Similarly, as illustrated in bracketed row 58, another example of a noise reduction filter would allow for ignoring snapshot observations if any fault is logged within a predetermined period of time, e.g., $t_2$ ms, as any previously two logged faults.

As suggested above, one key feature of the present invention allows for using candidate snapshot anomalies to process, the fault log data and/or the operational parameter data. As used herein, candidate snapshot anomalies refer to one or more conditions that may be triggered based upon deviations in the snapshot data and/or the fault log data. One example of a candidate snapshot anomaly that conveniently uses predetermined operational parameter data is illustrated in the data field entry adjacent to bracket 60. In this case, the candidate snapshot anomaly would be triggered if the engine water temperature exceeds the engine oil temperature by a predetermined temperature, e.g., $T_1°$ C., and if the water temperature is above another predetermined temperature e.g., $T_2°$ C. Upon such conditions being met by the respective snapshot parameters, then this exemplary candidate snapshot anomaly would be triggered and would allow for declaring a cooling subsystem malfunction with a higher level of confidence than would otherwise be feasible if one were to rely on fault log data alone. It will be appreciated that using the foregoing candidate snapshot anomaly in combination with detection of one or more faults regarding the cooling subsystem will increase the probability that in fact there is a malfunction of the cooling subsystem as compared to detection of cooling subsystem faults by themselves. Another example of a candidate snapshot anomaly is illustrated by the data field entry adjacent to bracket 62. In this case, the candidate snapshot anomaly would be triggered when the oil engine temperature exceeds the water engine temperature by a predetermined temperature, e.g., $T_1°$ C., and if the oil temperature is above another predetermined temperature e.g., $T_2°$ C. Upon being triggered this other exemplary candidate snapshot anomaly would allow for declaring a malfunction in the lubrication subsystem of the engine with a higher level of confidence than would otherwise be possible. Once again it will be appreciated that the foregoing candidate snapshot anomaly in combination with detection of one or more faults regarding the lubrication subsystem will increase the probability that in fact there is a malfunction of the lubrication subsystem as compared to detection of lubrication subsystem faults by themselves. For the sake of clarity of understanding, the foregoing examples of candidate snapshot anomalies and noise reduction filters were chosen to be relatively straightforward. However, as will be recognized by those skilled in the art, the construction of noise reduction filters and/or candidate snapshot anomalies construction may involve searching for combinations of clusters or groups of faults as well as searching for respective combinations of observations of multiple snapshot operational parameters, using the analysis techniques disclosed in the foregoing patent applications.

Figure 5:
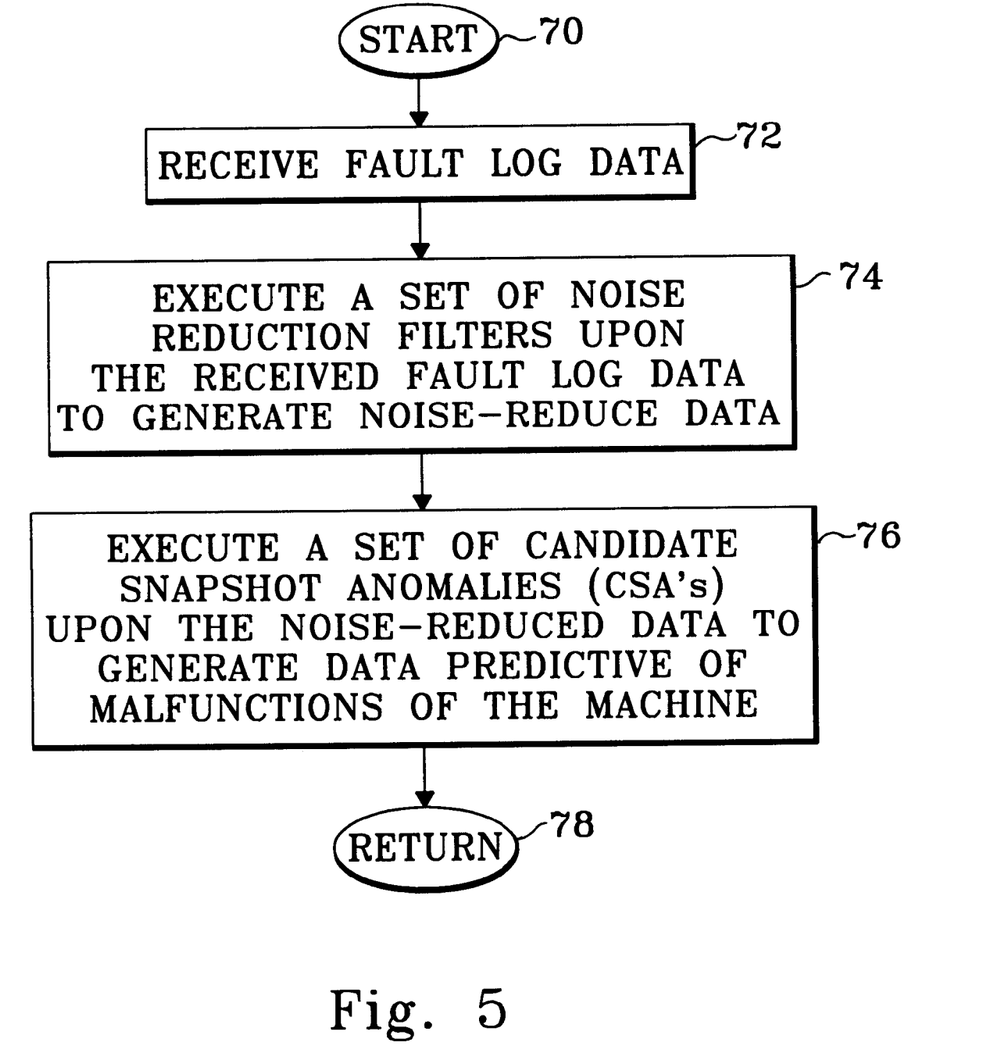
FIG. 5 is a flow chart illustrating one exemplary embodiment for using the noise reduction filters and the candidate snapshot anomalies.

FIG. 5 illustrates a flow chart of one exemplary embodiment of the present invention. Subsequent to start of operations in step 70, step 72 allows for receiving the fault log data. As suggested above, step 74 allows for executing a set of noise reduction filters upon the received fault log data to generate noise-reduced data. Prior to return step 78, step 76 allows for executing a set of candidate snapshot anomalies upon the noise-reduced data to generate data predictive of malfunctions of the machine. Each predicted malfunction may be correlated with the repair data using statistical correlation techniques well-understood by those skilled in the art. As illustrated in FIG. 4, the repair data may include respective repair codes 64 and may further indicate one or more corrective actions to be taken once a specific malfunction is detected. The indication, for example, may be for the operator to disengage a respective handbrake unintentionally activated, or suggest the replacement of a given replaceable unit, or in more complex situations may suggest to the operator to bring the locomotive to a selected repair site where needed specialized tools may be available to perform the repair. Preferably, prior to generating a respective repair code for a predictive malfunction, a respective repair weight should be retrieved from a directed weight data storage unit 26 (FIG. 1) to verify that the predicted malfunction and selected repair meet the respective weight assigned to the predicted malfunction or repair. It will be appreciated that the initial values for the directed weight data may be obtained based on the knowledge of experts and/or empirical data, that is, the values of the directed weight data may be initially assigned. However, as additional cases are used to populate a case data storage unit 24 (FIG. 1), the system may be configured to automatically adjust or adapt the respective values of the directed weight data based on the cumulative knowledge acquired from such additional cases. Similarly, both the noise-reduction filters and the candidate snapshot anomalies may be adapted or modified based on the cumulative knowledge extracted from the additional cases.

Figure 6:
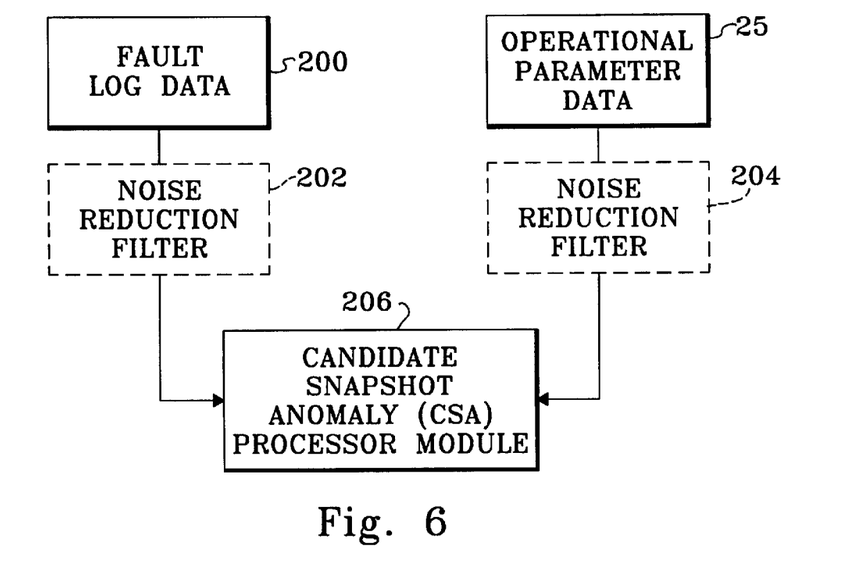
FIG. 6 illustrates further details regarding the processor of FIG. 1.

FIG. 6 illustrates an exemplary embodiment wherein a candidate snapshot anomaly processor module 208, which may be part of processor 12, receives fault log data 100 and operational parameter data 52 that may be optionally filtered or noise-reduced by respective noise reduction filters 202 and 204 using the noise reduction filters discussed in the context of FIG. 4. Preferably, processor module 206 receives noise-reduced data both for the fault log data and the operational parameter data. However, processor module 206 is not restricted to operating on noise-reduced data since the candidate snapshot anomalies could also be directly executed on unfiltered or raw fault log data and/or operational parameter data.

Figure 7:
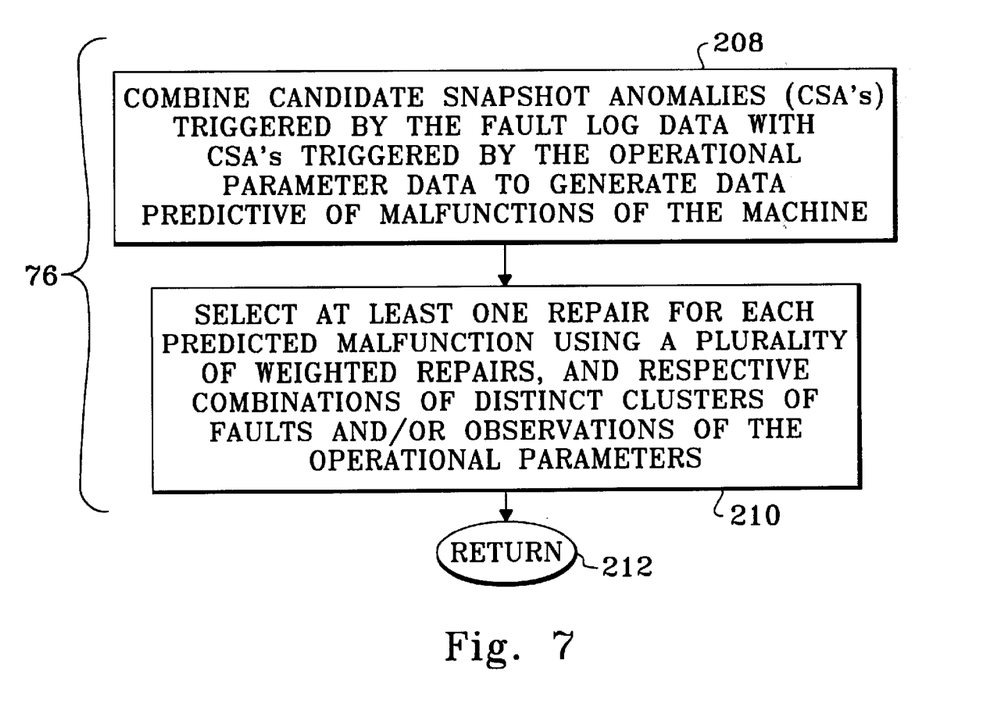
FIG. 7 is a flowchart describing steps for selecting a respective repair for a predicted malfunction upon analysis of the fault data and/or the operational parameter data.

FIG. 7 illustrates a flow chart illustrating additional processing steps performed by processor module 206 regarding executing step 76 (FIG. 5). For example, step 208 allows for combining candidate snapshot anomalies triggered by the fault log data with candidate snapshot anomalies triggered by the operational parameter data to generate data predictive of malfunctions of the machine. Prior to return step 212, step 210 allows for selecting at least one repair for each predicted malfunction using a plurality of weighted repairs and, as suggested above, respective combinations of distinct clusters of faults and/or observations of operational parameters.

Figure 8:
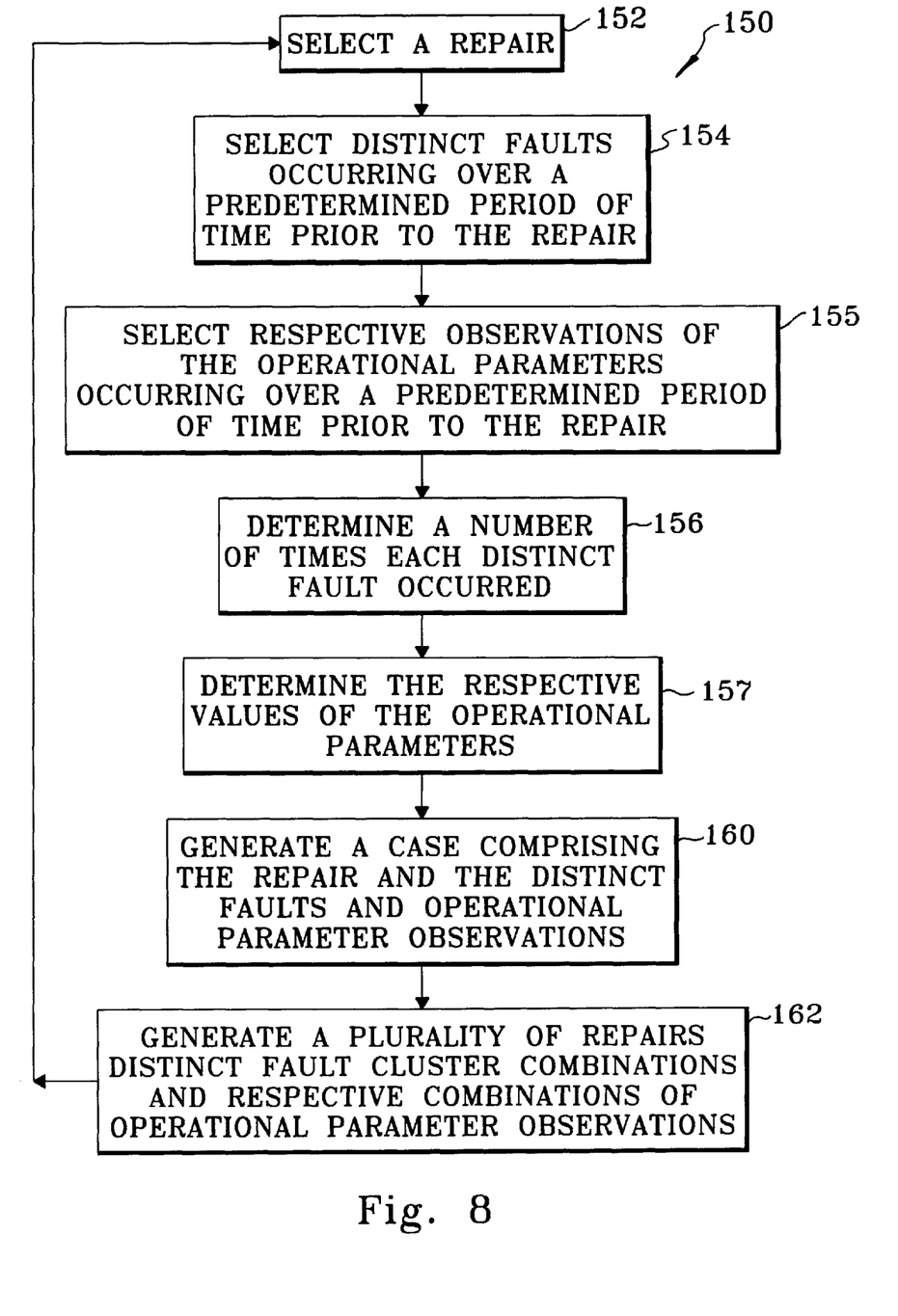
FIG. 8 is flow chart describing steps for generating a plurality of respective cases, including predetermined repairs, fault cluster combinations and operational parameter observations for each case.

FIG. 8 is a flowchart of an exemplary process 150 of the present invention for selecting or extracting repair data from repair data storage unit 20, fault log data from fault log data storage unit 22, and operational parameter data from operational parameter data storage unit 29 and generating a plurality of diagnostic cases, which are stored in a case storage unit 24. As used herein, the term "case" comprises a repair and one or more distinct faults or fault codes in combination with respective observations of one or more operational parameters.

With reference still to FIG. 8, process 150 comprises, at 152, selecting or extracting a repair from repair data storage unit 20 (FIG. 1). Given the identification of a repair, the present invention searches fault log data storage unit 22 (FIG. 1) to select or extract, at 154, distinct faults occurring over a predetermined period of time prior to the repair. Similarly, operational parameter data storage unit 29 (FIG. 1) may be searched to select or extract, at 155, respective observations of the operational parameter data occurring over a predetermined period of time prior to the repair. Once again, the observations may include snapshot observations, or may include substantially continuous observations that would allow for detecting trends that may develop over time in the operational parameter data and that may be indicative of malfunctions in the machine. The predetermined period of time may extend from a predetermined date prior to the repair to the date of the repair. Desirably, the period of time extends from prior to the repair, e.g., 14 days, to the date of the repair. It will be appreciated that other suitable time periods may be chosen. The same period of time may be chosen for generating all of the cases.

At 156, the number of times each distinct fault occurred during the predetermined period of time is determined. At 157, the respective values of the observations of the operational parameters is determined. A plurality of repairs, one or more distinct fault cluster and respective observations of the operational parameters are generated and stored as a case, at 160. For each case, a plurality of repair, respective fault cluster combinations, and respective combinations of clusters of observations of the operational parameters is generated at 162.

Figure 9:
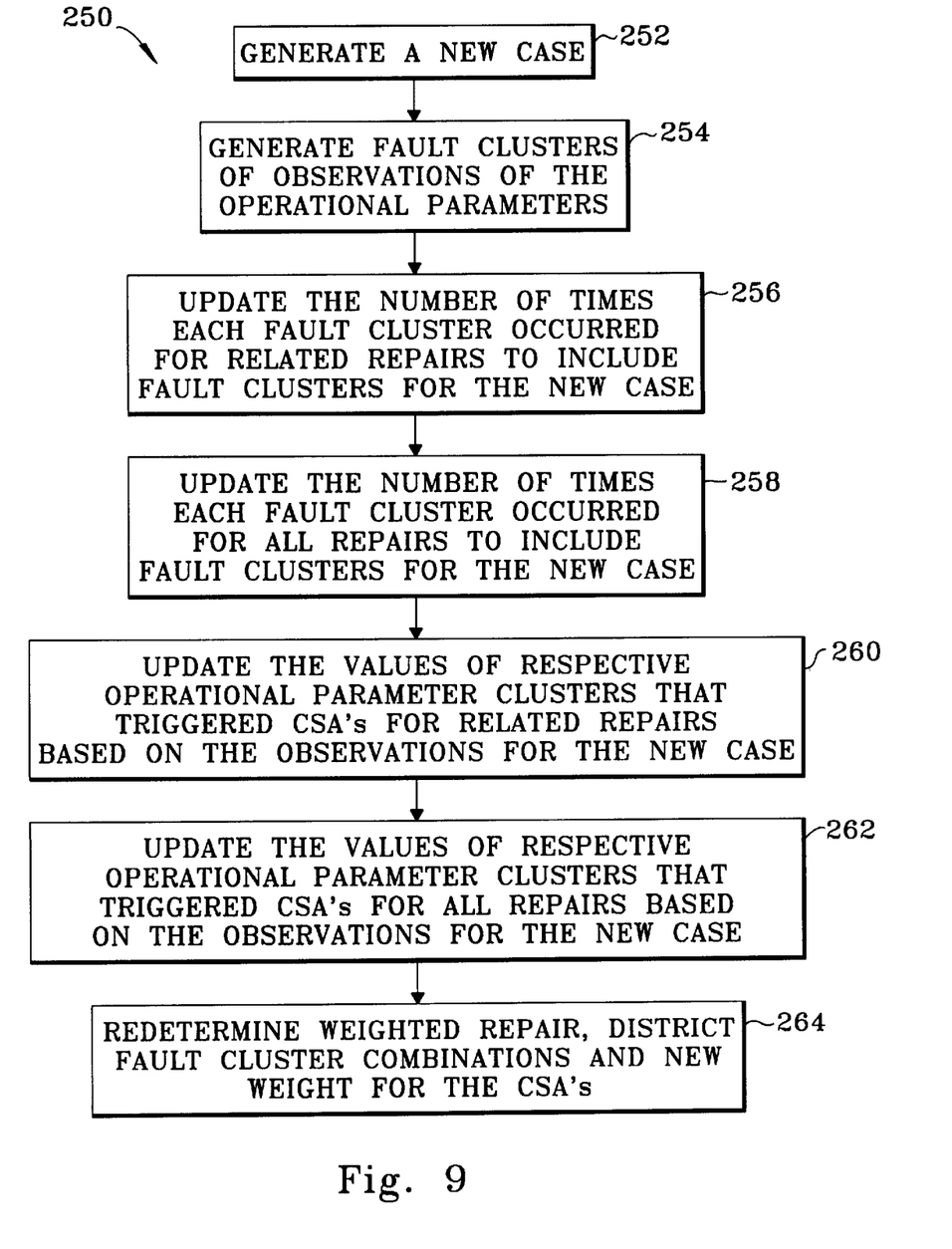
FIG. 9 is a flowchart describing the steps for adding a new case to the case database and updating the weighted repair, distinct fault cluster combinations and respective weights for the candidate snapshot anomalies.

As shown in FIG. 9, a process 250 of the present invention provides for updating directed weight data storage unit 26 to include one or more new cases. For example, once a new case is generated, a new repair, fault log data, and operational parameter data from a malfunctioning locomotive is received at 252. At 254, a plurality of distinct fault cluster combinations and clusters of observations of the operational parameters is generated.

The number of times each fault cluster occurred for related repairs is updated at 256 and the number of times each fault cluster occurred for all repairs are updated at 258. Similarly, respective values of the clusters of observations of the operational parameters that triggered respective candidate snapshot anomalies for related repairs may be averaged and updated at 260 and respective values of the operational parameters that triggered respective candidate snapshot anomalies for all repairs may be averaged and updated at 262. Thereafter, the weighted repair, the distinct fault cluster combinations and the respective weight values for the candidate snapshot anomalies are redetermined at 264. For example, although the candidate snapshot anomaly may have initially postulated that if the engine water temperature exceeds the engine oil temperature by $T_1°$ C., and if the water temperature is above $T_2°$ C., then the candidate snapshot anomaly would declare a cooling subsystem malfunction. However consistent with the adaptive features of the present invention, at step 260, the learning algorithm would conveniently allow for redetermining the respective temperature values required to trigger the candidate snapshot anomaly, in view of the accumulated knowledge gained from each new case. In addition, the candidate snapshot anomalies themselves could be modified to add observations of new parameters or delete observations from parameters that were initially believed to be statistically meaningful but in view of the cumulative knowledge acquired with each new case are proven to be of little value for triggering a respective candidate snapshot anomaly, i.e., equivalent to a "Don't Care" variable in Boolean logic. As suggested above, further analysis of the repair data could indicate that ambient temperature may be another parameter that could aid the candidate snapshot anomaly to trigger more accurately the prediction of malfunctions of the cooling subsystem.

As noted above, the system provides prediction of malfunctions and repair selection from hybrid analysis of fault log data and operational parameter data from a malfunctioning machine. Desirably, after verification of the repair(s) for correcting a malfunction the new case can be inputted and updated into the system.

From the present invention, it will be appreciated by those skilled in the art that the repair, respective fault cluster combinations and observations of operational parameters may be generated and stored in memory when generating the weights therefore, or alternatively, be stored in either the case data storage unit, directed weight storage unit, or a separate data storage unit.

Thus, the present invention provides in one aspect a method and system for automatically harvesting potentially valid diagnostic cases by interleaving repair, fault log data which is not restricted to sequential occurrences of faults or error log entries and operational parameter data that could be made up of snapshot observations and/or substantially continuous observations. In another aspect, standard diagnostic fault clusters and suitable candidate snapshot anomalies using operational parameters and/or fault data can be generated in advance so they can be identified across all cases and their relative occurrence tracked.

The present invention further allows use of noise reduction filters that may enhance the predictive accuracy of the diagnostic algorithms used therein. In yet another aspect, the invention allows for readjusting the assigned weights to the repairs, the candidate snapshot anomalies and the noise reduction filters based on extracting knowledge that is accumulated as each new case is closed.

In addition, when initially setting up case data storage unit 24, a field engineer may review each of the plurality of cases to determine whether the collected data, either fault log data and/or operational parameter data, provide a good indication of the repair. If not, one or more cases can be excluded or removed from case data storage unit 24. This review by a field engineer would increase the initial accuracy of the system in assigning weights to the repair, candidate snapshot malfunctions and fault cluster combinations.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for analyzing fault log data from railroad locomotives and other large land-based, self-powered transport equipment undergoing diagnostics, the method comprising:

receiving fault log data comprising a plurality of faults from the equipment;

executing a set of noise-reduction filters upon the received fault log data to generate noise-reduced fault log data; and executing a set of candidate snapshot anomalies upon the noise-reduced data to generate data indicative of malfunctions of the equipment.

2. The method of claim 1 further comprising receiving operational parameter data comprising a plurality of snapshot observations of operational parameters from the equipment, executing a set of noise reduction filters upon the operational parameter data so as to generate noise-reduced operational parameter data and executing the set of candidate snapshot anomalies upon the noise-reduced operational parameter data.

3. The method of claim 2 further comprising a step of considering any candidate snapshot anomalies respectively triggered by the noise-reduced fault log data in light of any candidate snapshot anomalies respectively triggered by the noise-reduced parameter data so as to enhance the accuracy of the data indicative of malfunctions of the equipment.

4. The method of claim 1 further comprising selecting at least one repair for each indicated malfunction using a plurality of respective weighted repairs, and respective combinations of distinct clusters of faults.

5. The method of claim 4 further comprising selecting at least one repair for each indicated malfunction using a plurality of respective weighted repairs, and respective combinations of distinct clusters of faults and/or operational parameters.

6. A method for analyzing fault log data from a machine undergoing diagnostics, the method comprising:
    receiving fault log data comprising a plurality of faults from the machine;
    executing a set of noise-reduction filters upon the received fault log data to generate noise-reduced fault log data; and
    executing a set of candidate snapshot anomalies upon the noise-reduced data to generate data predictive of malfunctions of the machine.

7. The method of claim 6 further comprising selecting at least one repair for each predicted malfunction using a plurality of respective weighted repairs, and respective combinations of distinct clusters of faults.

8. The method of claim 6 further comprising receiving operational parameter data comprising a plurality of snapshot observations of operational parameters from the machine.

9. The method of claim 8 wherein the respective snapshot observations of the operational parameters from the machine and the logging of respective faults from the machine are temporally aligned relative to one another.

10. The method of claim 8 wherein the step of executing noise reduction further comprises executing the set of noise reduction filters upon the operational parameter data so as to generate noise-reduced operational parameter data.

11. The method of claim 10 further comprising executing the set of candidate snapshot anomalies upon the noise-reduced operational parameter data.

12. The method of claim 11 further comprising a step of combining any candidate snapshot anomalies respectively triggered by the noise-reduced fault log data with any candidate snapshot anomalies respectively triggered by the noise-reduced parameter data so as to enhance the accuracy of the data predictive of malfunctions of the machine.

13. The method of claim 12 further comprising selecting at least one repair for each predicted malfunction using a plurality of respective weighted repairs, and respective combinations of distinct clusters of faults and/or operational parameters.

14. A method for analyzing fault log data and operational parameter data from a machine undergoing diagnostics, the method comprising:
    receiving fault log data comprising a plurality of faults from the machine;
    receiving operational parameter data comprising a plurality of snapshot observations of respective operational parameters from the machine;
    executing a set of noise-reduction filters upon the received fault log data and upon the received operational parameter data to generate noise-reduced fault log data and noise-reduced operational parameter data; and
    executing a set of candidate snapshot anomalies upon the noise-reduced fault log data and upon the noise-reduced operational parameter data to generate data predictive of malfunctions of the machine.

15. The method of claim 14 further comprising a step of combining any candidate snapshot anomalies respectively triggered by the noise-reduced fault log data with any candidate snapshot anomalies respectively triggered by the noise-reduced parameter data.

16. The method of claim 14 further comprising selecting at least one repair for each predicted malfunction using a plurality of respective weighted repairs, and respective combinations of distinct clusters of faults.

17. The method of claim 14 further comprising selecting at least one repair for each predicted malfunction using a plurality of respective weighted repairs, and respective combinations of distinct clusters of faults and/or operational parameters.

18. The method of claim 14 wherein the respective snapshot observations of the operational parameters from the machine and the logging of respective faults from the machine are temporally aligned relative to one another.

19. A method for analyzing fault log data and operational parameter data from a machine undergoing diagnostics, the method comprising:
    receiving fault log data comprising a plurality of faults from the machine;
    receiving operational parameter data comprising a plurality of snapshot observations of operational parameters from the machine;
    executing a set of candidate snapshot anomalies upon the fault log data and upon the operational parameter data; and
    combining any candidate snapshot anomalies respectively triggered by the fault log data with any candidate anomalies respectively triggered by the parameter data to generate data predictive of malfunctions of the machine.

20. The method of claim 19 wherein prior to executing the set of candidate snapshot anomalies a step of executing a set of noise-reduction filters is performed upon the fault log data and the operational parameter data.

21. A system for analyzing fault log data and operational parameter data from a machine undergoing diagnostics, the system comprising:
    means for receiving fault log data comprising a plurality of faults from the machine;
    a memory unit configured to store a set of noise-reduction filters and a set of candidate snapshot anomalies; and
    a processor respectively coupled to the means for receiving fault log data and to the memory unit, the processor comprising:
        means for executing the set of noise-reduction filters upon the received fault log data to generate noise-reduced fault log data; and
        means for executing the set of candidate snapshot anomalies upon the noise-reduced data to generate data predictive of malfunctions of the machine.

22. The system of claim 21 further comprising means for selecting at least one repair for each predicted malfunction using a plurality of respective weighted repairs, and respective combinations of distinct clusters of faults.

23. The system of claim 21 further comprising means for receiving operational parameter data comprising a plurality of snapshot observations of respective operational parameters from the machine.

24. The system of claim 23 wherein the respective snapshot observations of the operational parameters from the machine and the logging of respective faults from the machine are temporally aligned relative to one another.

25. The system of claim 23 wherein the processor further comprises means for executing the set of noise reduction filters upon the operational parameter data so as to generate noise-reduced operational parameter data.

26. The system of claim 25 wherein the processor further comprises means for executing the set of candidate snapshot anomalies upon the noise-reduced operational parameter data.

27. The system of claim 26 further comprising means for combining any candidate snapshot anomalies respectively triggered by the noise-reduced fault log data with any candidate snapshot anomalies respectively triggered by the noise-reduced parameter data so as to enhance the accuracy of the data predictive of malfunctions of the machine.

28. The system of claim 27 further comprising means for selecting at least one repair for each predicted malfunction using a plurality of respective weighted repairs, and respective combinations of distinct clusters of faults and/or operational parameters.

29. A system for analyzing fault log data and operational parameter data from a machine undergoing diagnostics, the system comprising:
   means for receiving fault log data comprising a plurality of faults from the machine;
   means for receiving operational parameter data comprising a plurality of operational parameters;
   a memory unit configured to store a set of noise-reduction filters and a set of candidate snapshot anomalies; and
   a processor respectively coupled to the means for receiving fault log data and to the memory unit, the processor comprising:
      means for executing the set of noise-reduction filters upon the received fault log data and upon the operational parameter data to generate noise-reduced hybrid data; and
      means for executing the set of candidate snapshot anomalies upon the noise-reduced hybrid data to generate data predictive of malfunctions of the machine.

30. An article of manufacture comprising:
   a computer program product comprising a computer-usable medium having a computer-readable code therein for executing the analysis of fault log data and operational parameter data from a machine undergoing diagnostics, the computer-readable code in the article of manufacture comprising:
      a computer-readable program code module for receiving fault log data comprising a plurality of faults from the machine;
      a computer-readable program code module for receiving operational parameter data comprising a plurality of snapshot observations of operational parameters;
      a computer-readable program code module embodying therein a set of noise-reduction filters and a set of candidate snapshot anomalies;
      a computer-readable program code module for executing the set of noise-reduction filters jointly upon the received fault log data and upon the operational parameter data to generate noise-reduced hybrid data; and
      a computer-readable program code module for executing the set of candidate snapshot anomalies upon the noise-reduced hybrid data to generate data predictive of malfunctions of the machine.

31. A method for analyzing fault log data and operational parameter data from railroad locomotives and other large land-based, self-powered transport equipment undergoing diagnostics, the method comprising:
   receiving fault log data comprising a plurality of faults from the equipment;
   receiving operational parameter data comprising a plurality of snapshot observations of operational parameters from the equipment;
   executing a set of candidate snapshot anomalies upon the fault log data and upon the operational parameter data; and
   considering any candidate snapshot anomalies respectively triggered by the fault log data in light of any candidate anomalies respectively triggered by the parameter data to generate data predictive of malfunctions of the equipment.

32. The method of claim 31 wherein prior to executing the set of candidate snapshot anomalies a step of executing a set of noise-reduction filters is performed upon the fault log data and the operational parameter data.

33. The method of claim 31 wherein the considering of data comprises comparing the fault log data and parameter data.

34. The method of claim 31 wherein the considering of data comprises combining the fault log data and parameter log data.

35. A system for analyzing fault log data and operational parameter data from railroad locomotives and other large land-based, self-powered transport equipment undergoing diagnostics, the system comprising:
   a module for receiving fault log data comprising a plurality of faults from the equipment;
   a memory unit configured to store a set of noise-reduction filters and a set of candidate snapshot anomalies; and
   a processor respectively coupled to the module for receiving fault log data and to the memory unit, the processor comprising:
      a processor for executing the set of noise-reduction filters upon the received fault log data to generate noise-reduced fault log data; and
      a processor for executing the set of candidate snapshot anomalies upon the noise-reduced data to generate data predictive of malfunctions of the equipment.

36. The system of claim 35 further comprising a memory unit receiving operational parameter data comprising a plurality of snapshot observations of respective operational parameters from the equipment;
   a processor for executing the set of noise reduction filters upon the operational parameter data so as to generate noise-reduced operational parameter data; and
   a processor for executing the set of candidate snapshot anomalies upon the noise-reduced operational parameter data.

37. The system of claim 35 further comprising a processor for considering any candidate snapshot anomalies respectively triggered by the noise-reduced fault log data in light of any candidate snapshot anomalies respectively triggered by the noise-reduced parameter data so as to enhance the accuracy of the data indicative of malfunctions of the equipment.

38. A process for analyzing fault log data from railroad locomotives and other large land-based, self-powered transport equipment so as to identify respective faults and/or fault combinations indicative of machine malfunctions, the process comprising:
   a) collecting a set of new fault log data from the equipment;
   b) retrieving prior fault log data of the equipment held in memory, the prior fault log data having been collected at an earlier time than the data collected in step a);

c) considering the new fault log data in light of the prior fault log data; and d) adjusting any repair recommendations based on the prior fault log data in light of the consideration of the new fault log data.

39. The process of claim 38 wherein the considering of data comprises determining respective occurrences of any new faults since the last collection of data.

40. The process of claim 38 wherein the considering of data comprises determining respective occurrences of any repeat faults.

41. The process of claim 38 wherein the repair recommendation is based upon considering respective repair entries in an externally-derived file of repairs, each fault being associated with at least one or more repairs.

42. The process of claim 38 wherein the fault log data further comprises snapshot observations of predetermined operational parameters from the equipment.

43. A system for analyzing fault log data from railroad locomotives and other large land-based, self-powered transport equipment to identify respective faults and/or fault combinations indicative of equipment malfunctions, the system comprising:

memory for collecting and storing new fault log data from the equipment;

a processor for retrieving prior fault log data of the equipment, the prior fault log data obtained during an earlier collection of data relative to the collection of new fault log data;

a processor for considering the new fault log data in light of the prior fault log data; and a processor for adjusting any repair recommendations for the earlier fault log data based in light of the consideration of the new fault log data.

44. The system of claim 43 further comprising memory for an externally-derived file of repairs, each active fault being associated with at least one or more repairs.

* * * * *